(12) United States Patent
Tobino (10) Patent No.: US 9,027,614 B2
(45) Date of Patent: May 12, 2015

(54) HEAVY DUTY PNEUMATIC TIRE

(75) Inventor: Yoshiyuki Tobino, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 577 days.

(21) Appl. No.: 13/282,645

(22) Filed: Oct. 27, 2011

(65) Prior Publication Data

US 2012/0118458 A1     May 17, 2012

(30) Foreign Application Priority Data

Nov. 11, 2010    (JP) ................................ 2010-253116

(51) Int. Cl.
     *B60C 11/12*        (2006.01)
     *B60C 11/11*        (2006.01)

(52) U.S. Cl.
     CPC ............... *B60C 11/11* (2013.01); *B60C 11/12* (2013.01); *B60C 2200/06* (2013.01); *B60C 2011/1209* (2013.01); *B60C 2011/1295* (2013.01); *Y10S 152/03* (2013.01); *Y10S 152/902* (2013.01)

(58) Field of Classification Search
     CPC ............... B60C 2011/1295; B60C 2011/1209; B60C 11/12; B60C 11/11; B60C 2200/06
     USPC ....... 152/209.18, DIG. 3, 902, 209.1, 209.25; D12/577, 598, 582, 584, 571, 579, 562, D12/547, 549, 542, 536, 544
     IPC ....................................................... B60C 11/12
     See application file for complete search history.

(56) References Cited

U.S. PATENT DOCUMENTS

2009/0229721 A1*   9/2009   Ikeda ....................... 152/209.18

FOREIGN PATENT DOCUMENTS

| JP | 7-205617 A | 8/1995 | |
|----|------------|--------|--|
| JP | 2009190677 A * | 8/2009 | ............... B60C 11/11 |
| JP | 2009274726 A * | 11/2009 | ............ B60C 11/117 |

OTHER PUBLICATIONS

Machine translation of JP 2009-190677 (no date).*
Machine translation of JP 2009-274726 (no date).*

* cited by examiner

*Primary Examiner* — Richard Crispino
*Assistant Examiner* — Philip N Schwartz
(74) *Attorney, Agent, or Firm* — Birch, Stewart, Kolasch & Birch, LLP

(57) ABSTRACT

A heavy duty pneumatic tire comprises a tread portion provided with circumferentially continuous main grooves and lateral grooves to form blocks in circumferential rows. The main grooves include a pair of shoulder main grooves disposed one on each side of the tire equator so that the center line thereof is at a distance of 0.30 to 0.65 times one half of the tread width from the tire equator. The blocks include crown blocks disposed in a tread crown region between the shoulder main grooves, and shoulder blocks disposed in shoulder regions axially outside the shoulder main grooves. Each of the crown blocks and shoulder blocks is provided with at least one axially extending sipe.

7 Claims, 6 Drawing Sheets

HEAVY DUTY PNEUMATIC TIRE

BACKGROUND OF THE INVENTION

1. Field of the Invention

The present invention relates to a heavy duty pneumatic tire capable of maintaining on-ice performance without being influenced by magnitude of a tire load and a tire pressure.

2. Description of the Background Art

There has been proposed a heavy duty pneumatic tire having a plurality of blocks provided with sipes to enhance on-ice performance. (see Japanese Patent Application Publication No. 7-205617, for example). Such a heavy duty pneumatic tire can increase a frictional force with respect to a frozen road surface by exerting edges of the blocks and the sipes, and can enhance a driving force and a braking force.

SUMMARY OF THE INVENTION

Figure 6A:
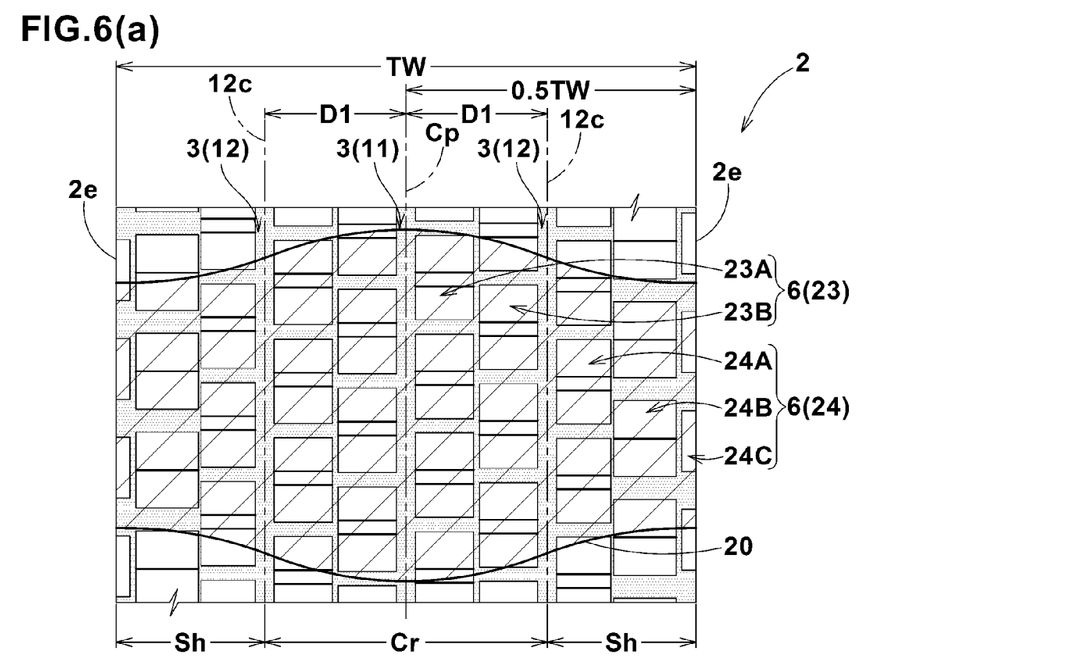
FIG. 6(a) is a development view of the tread portion showing a ground-contact surface when a tire load is high or a tire pressure is low.
Figure 6B:
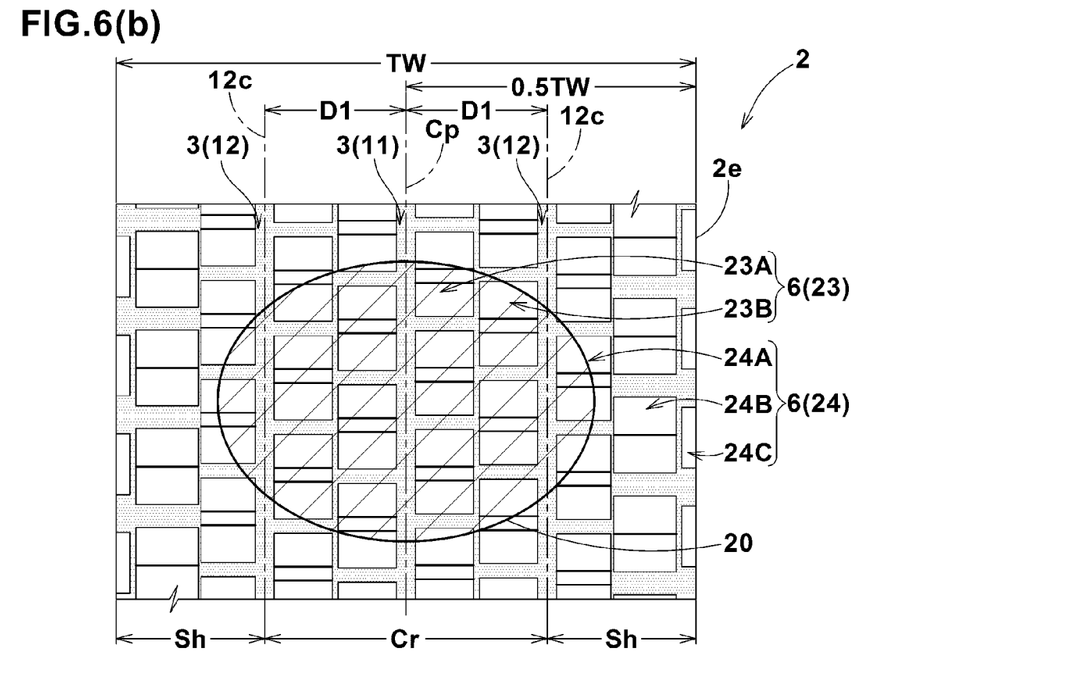
FIG. 6(b) is a development view of the tread portion showing a ground-contact surface when the tire load is low or the tire pressure is high.

FIG. 6 show a ground-contact surface 20 of a tread portion 2 of a heavy duty pneumatic tire having a block pattern, wherein FIG. 6(a) shows the ground-contact surface 20 when a tire load is high or a tire pressure is low, and FIG. 6(b) shows the ground-contact surface 20 when the tire load is low or the tire pressure is high. As apparent from FIGS. 6(a) and 6(b), when the tire load is low or the tire pressure is high, the ground-contact surface 20 of the tread portion 2 becomes small as compared with the case where the tire load is high or the tire pressure is low, and there is a problem that the edges of the sipes and/or blocks in a tread shoulder can not be effectively used, and the on-ice performance is liable to be deteriorated.

Hence, the present inventor focused on a fact that a crown region Cr of a tire tread in the tire axial direction located inside of positions away from the tire equatorial plane CP by distances D1 of 0.30 to 0.65 times the tread half width 0.5 Tw can relatively stably came into contact with the ground without being influenced by magnitude of a tire load and a tire pressure, and studied closely. As a result, the inventor ascertained that if the edges in the tread crown region Cr are made larger than the edges in a tread shoulder region Sh, excessive reduction in the edges can be suppressed and the on-ice performance can be maintained even when the tire load is low or the tire pressure is high and thereby the ground-contact surface 20 of the tread portion 2 became small.

The present invention has been accomplished in view of the above circumstances, and the tread portion is provided with a pair of shoulder main grooves which are spaced apart from the tire equatorial plane by a predetermined distance, and crown blocks and shoulder blocks each provided with at least one sipe, and a length of the sipe and a length of a lateral edge are limited to predetermined ranges. Based on this, it is an object of the invention to provide a heavy duty pneumatic tire capable of maintaining on-ice performance without being influenced by magnitude of a tire load and a tire pressure.

In a heavy duty pneumatic tire of the present invention, a tread portion is provided with a plurality of main grooves which continuously extend in a tire circumferential direction, and with a plurality of lateral grooves extending in a direction intersecting with the main grooves, thereby being provided with blocks at a distance from each other in the tire circumferential direction and arranged in a plurality of block rows.

The main grooves include a pair of shoulder main grooves which are disposed on outermost sides in the tire axial direction and a groove center line of each of which is spaced apart from the tire equatorial plane by a distance of 0.30 to 0.65 times a tread half width. Since the shoulder main grooves can stably come into contact with the ground without being influenced by magnitude of a tire load and a tire pressure, it becomes possible to sufficiently exert the edges thereof and to enhance the on-ice performance. Since the shoulder main grooves can secure the rigidity of the later-described shoulder blocks, it is possible to suppress uneven wear such as shoulder wear.

The above-mentioned blocks include crown blocks disposed in the crown region between the shoulder main grooves, and shoulder blocks disposed in the shoulder region axially outside the shoulder main groove, the crown blocks and shoulder blocks are each provided with at least one sipe extending in the tire axial direction, and the heavy duty pneumatic tire satisfies the following equation (1):

$$(SScr + SBcr)/(SSsh + SBsh) \geq 1.05 \quad (1)$$

wherein

SScr: a total sum of axial lengths of the sipes of all of the crown blocks,

SBcr: a total sum of axial lengths of lateral edges of the ground contacting faces of all of the crown blocks, wherein each of the lateral edges is one of two circumferentially-opposite lateral edges of the ground contacting face of one of the crown blocks, SSsh: a total sum of axial lengths of the sipes of all of the shoulder blocks, and SBsh: a total sum of axial lengths of lateral edges of the ground contacting faces of all of the shoulder blocks, wherein each of the lateral edges is one of two circumferentially-opposite lateral edges of the ground contacting face of one of the shoulder blocks.

According to such heavy duty pneumatic tire, the edges of the crown blocks which can stably come into contact with the ground without being influenced by magnitude of the tire load and the tire pressure are made larger than the edges of the shoulder blocks. Therefore, excessive reduction in the edges can be suppressed even when the tire load is low or the tire pressure is high in which case the ground-contact surface of the tread portion becomes small. Therefore, according to the heavy duty pneumatic tire of the invention, the on-ice performance can be maintained without being influenced by magnitude of the tire load and the tire pressure.

In this specification, unless otherwise noted, sizes of various portions of the tire are values measured in a normal state where the tire is mounted on a standard rim, and inflated to a standard tire pressure, but no tire load is applied to the tire.

The "standard rim" is a rim determined for each tire by a specification standard including a specification on which the tire is based, for example, the "standard rim" specified in JATMA, "Design Rim" in TRA, and "Measuring Rim" in ETRTO.

The "standard tire pressure" is an air pressure determined for each tire by the specification, for example, the "maximum air pressure" specified in JATMA, the maximum value described in "TIRE LOAD LIMITS AT VARIOUS COLD INFLATION PRESSURES" in TRA, and "INFLATION PRESSURE" in ETRTO.

DESCRIPTION OF THE PREFERRED EMBODIMENTS

An embodiment of the present invention will be described below based on the accompanying drawings.

Figure 1:
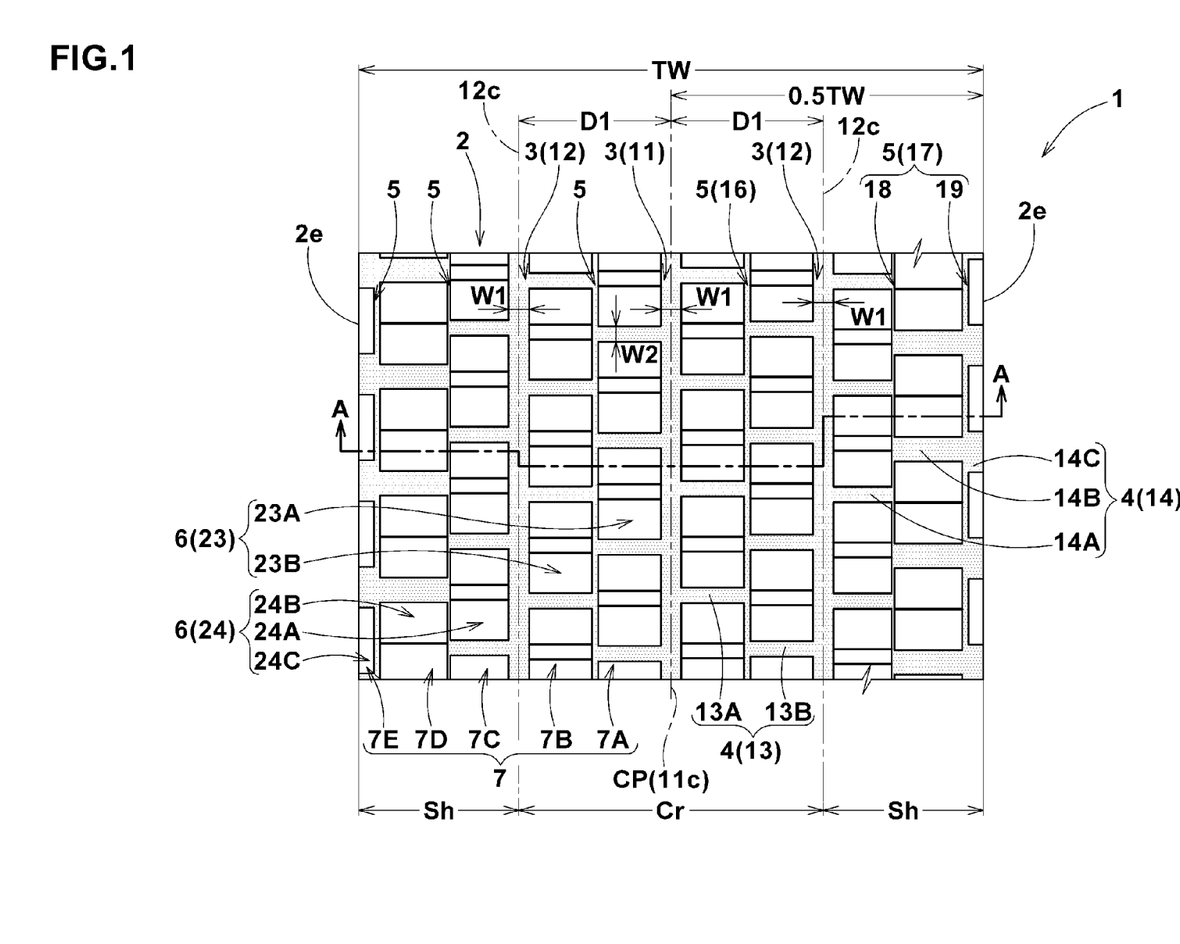
FIG. 1 is a development view of the tread portion of a heavy duty pneumatic tire according to an embodiment of the present invention.

In FIG. 1, a winter tire for a heavy duty vehicle such as a truck and a bus is shown as a heavy duty pneumatic tire 1 according to the embodiment.

The tire 1 is provided in the tread portion 2 with a plurality of main grooves 3 continuously extending in the tire circumferential direction, and a plurality of lateral grooves 4 extending in a direction intersecting with the main grooves 3. Further, the tread portion 2 is provided with at least one narrow groove 5 which continuously extends in the tire circumferential direction between the axially adjacent main grooves 3, and between the main grooves 3 and the tread edges 2e. Accordingly, in the tread portion 2, there are provided a plurality of rows 7 of blocks 6 defined by the main grooves 3, the lateral grooves 4 and the narrow groove 5.

In this embodiment, the main grooves 3 include a crown main groove 11 of which groove center line 11c extends on the tire equatorial plane CP, and a pair of shoulder main grooves 12 as axially outermost grooves of which groove center lines 12c are disposed one on each side of the groove center line 11c. Therefore, the tread portion 2 is divided into a tread crown region Cr between the shoulder main grooves 12 and shoulder regions Sh located on outer sides of the shoulder main grooves 12 in the tire axial direction.

Figure 2:
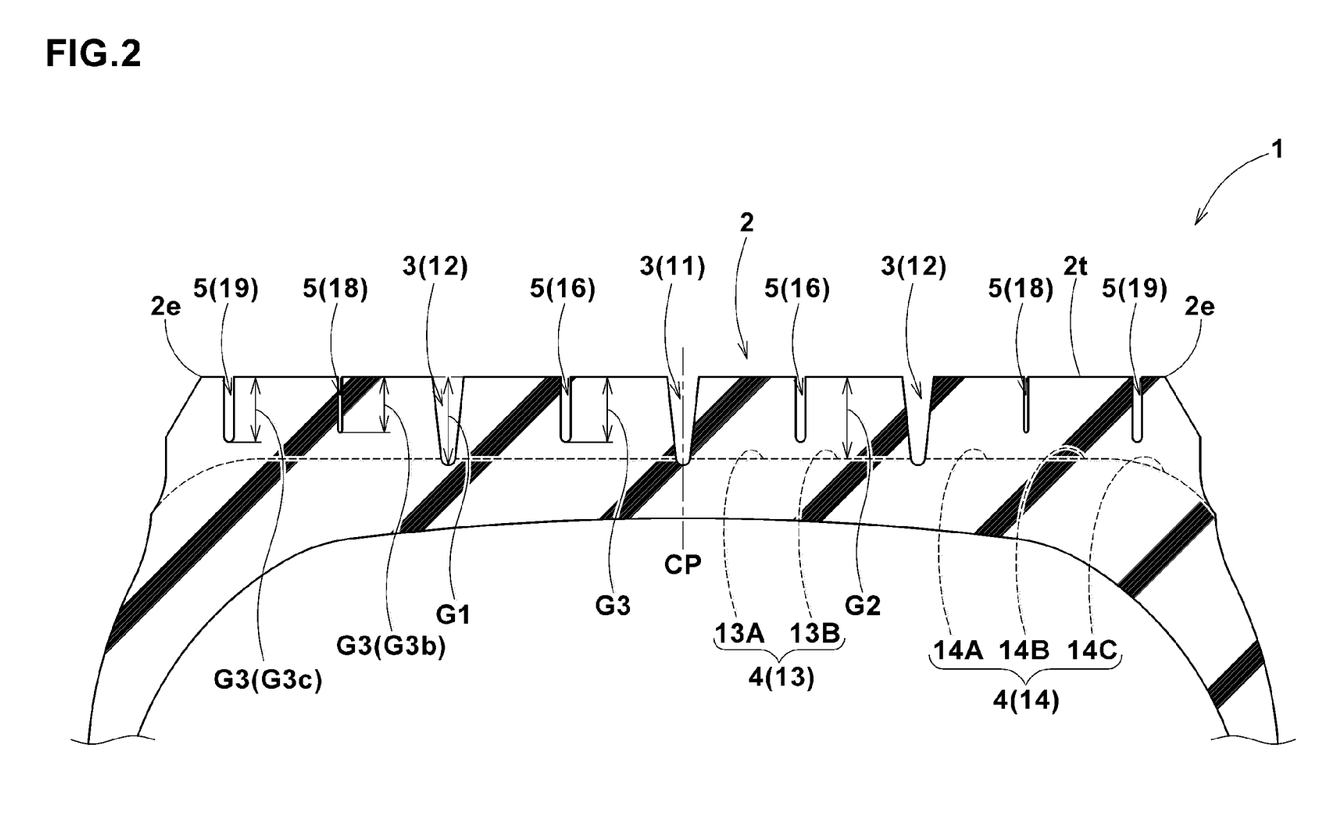
FIG. 2 is a sectional view taken along line A-A in FIG. 1.

As shown in FIGS. 1 and 2, the crown main groove 11 and the shoulder main grooves 12 are each formed to have a groove width W1 (measured perpendicular to the groove center line 11c, 12c) of about 4 to 8% of a tread half width 0.5TW which is equal to a ½ of a tread width TW, and a groove depth G1 of about 13 to 23% of the tread half width 0.5 TW.

Such crown main groove 11 and shoulder main grooves 12 can enhance drainage performance and on-snow performance while securing pattern rigidity of the tread portion 2.

In this embodiment, the crown main groove 11 and the shoulder main grooves 12 have the same groove widths W1 and the same groove depths G1, but they may be different from each other.

Here, the tread width TW is the distance between the tread edges 2e in the tire axial direction measured in the above-mentioned normal state.

When the tread edge 2e can be identified by a clear edge in appearance, the edge is defined by the edge, but if the tread edge 2e can not be identified by a clear edge, the ground-contact edge which is located on the outermost side in the tire axial direction when the standard load is applied to the tire in the normal state and when the tread portion 2 is brought into contact with a flat surface at a camber angle 0 degree is determined as the tread edge 2e.

The "standard load" is a tire load determined for each tire by the specification standard including the specification on which the tire is based, and is "maximum load ability" specified in JATMA, a maximum value described in the Table "TIRE LOAD LIMITS AT VARIOUS COLD INFLATION PRESSURES" in TRA, and a "LOAD CAPACITY" in ETRTO.

The lateral grooves 4 include crown lateral grooves 13 provided in the tread crown region Cr and shoulder lateral grooves 14 provided in each of the shoulder regions Sh. The crown lateral grooves 13 and the shoulder lateral grooves 14 each have a groove width W2 of about 3 to 7% of the tread half width 0.5 TW, and a groove depth G2 of about 12 to 22% of the tread half width 0.5 TW to enhance the drainage performance and the on-snow performance.

The narrow grooves 5 include a crown narrow groove 16 disposed between the crown main groove 11 and the shoulder main grooves 12, and shoulder narrow grooves 17 disposed between the shoulder main grooves 12 and the tread edges 2e.

Figure 3:
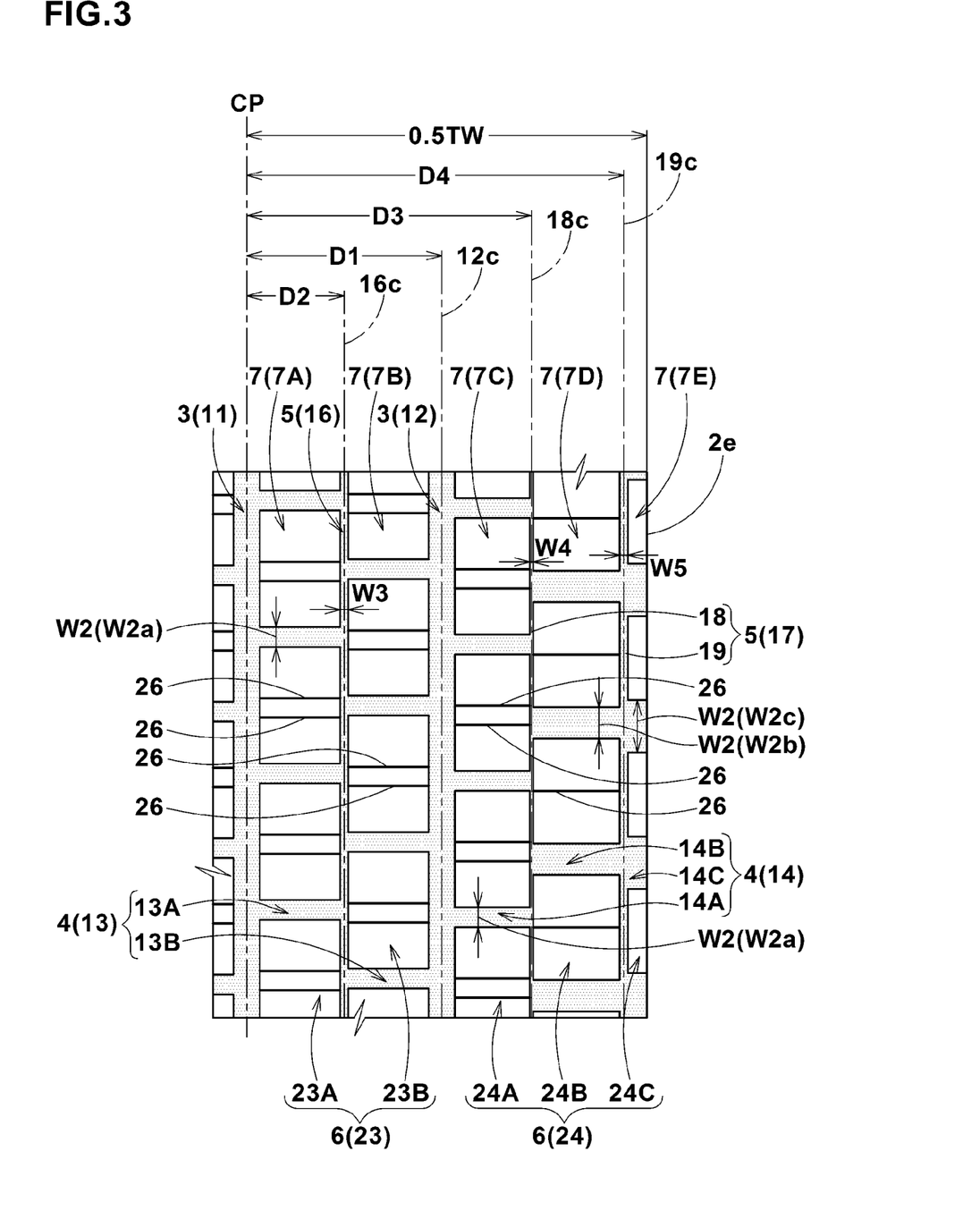
FIG. 3 is a partial enlarged view of FIG. 1.

As shown in FIG. 3, the groove center line 16c of the crown narrow groove 16 is disposed at a position spaced apart from the tire equatorial plane CP by a distance D2 of about 0.2 to 0.3 times the tread half width 0.5 TW, and the crown narrow groove 16 axially divides the axial part between the crown main groove 11 and the shoulder main groove 12 into two substantially equal axial width parts. Preferably, the groove width W3 of the crown narrow groove 16 is set to be about 1 to 2% of the tread half width 0.5 TW.

The shoulder narrow grooves 17 include an axially inner shoulder narrow groove 18 and an outer shoulder narrow groove 19.

It is preferable that the groove center line 18c of the axially inner shoulder narrow groove 18 is disposed at a position spaced apart from the tire equatorial plane CP by a distance D3 of about 0.6 to 0.7 times the tread half width 0.5 TW. It is preferable that the groove width W4 of the axially inner shoulder narrow groove 18 is set to be about 1 to 2% of the tread half width 0.5 TW.

It is preferable that the groove center line 19c of the axially outer shoulder narrow groove 19 is disposed at a position spaced apart from the tire equatorial plane CP by a distance D4 of about 0.92 to 0.96 times the tread half width 0.5 TW, and the groove width W5 of the axially outer shoulder narrow groove 19 is set to be about 2 to 3% of the tread half width 0.5 TW.

As shown in FIG. 3, the crown lateral grooves 13 include axially inner crown lateral grooves 13A extending between the crown main groove 11 and the crown narrow grooves 16, and axially outer crown lateral grooves 13B extending between the crown narrow grooves 16 and the shoulder main grooves 12. The axially inner crown lateral grooves 13A and axially outer crown lateral grooves 13B are arranged at substantially same circumferential pitches, but, the phase of the axially inner crown lateral grooves 13A is circumferentially shifted from the phase of the axially outer crown lateral grooves 13B.

The shoulder lateral grooves 14 include axially inner shoulder lateral grooves 14A extending between the shoulder main grooves 12 and the axially inner shoulder narrow grooves 18, intermediate shoulder lateral grooves 14B extending between the axially inner shoulder narrow grooves 18 and the axially outer shoulder narrow grooves 19, and axially outer shoulder lateral grooves 14C extending between the axially outer shoulder narrow grooves 19 and the tread edges 2e.

The axially inner shoulder lateral grooves 14A, intermediate shoulder lateral grooves 14B and axially outer shoulder lateral grooves 14C are arranged at substantially same circumferential pitches like the inner and axially outer crown lateral grooves 13A and 13B.

The phase of the inner shoulder lateral grooves 14A is circumferentially shifted from the phase of the axially outer crown lateral grooves 13B and also from the phase of the intermediate shoulder lateral grooves 14B.

Since the phases of the lateral grooves 13A, 13B, 14A and 14B are circumferentially shifted between the axially adjacent lateral grooves, it is possible to disperse a pitch noise during running.

The phase of the axially outer shoulder lateral grooves 14C matches with that of the intermediate shoulder lateral grooves 14B in the tire circumferential direction. This is of help to smoothly guide a water film on a road surface axially outward, and to enhance the drainage performance.

In this embodiment, the groove width W2b of the intermediate shoulder lateral grooves 14B is set larger than the groove width W2a of the axially inner shoulder lateral grooves 14A, and the groove width W2c of the outer shoulder lateral grooves 14C is set larger than the groove width W2b of the intermediate shoulder lateral grooves 14B. That is, the groove widths satisfy a relation W2a<W2b<W2c.

This relation can reduce rigidity of the blocks 6 from the tire equator C toward the tread edges 2e, and this is of help to reduce a wandering phenomenon of a vehicle when running on rutted roads. Further, as the groove widths W2 become increased toward the tread edges 2e, a tire chain can easily be caught in the blocks 6.

The blocks 6 include crown blocks 23 disposed in the tread crown region Cr and shoulder blocks 24 disposed in the shoulder regions Sh.

The crown blocks 23 include axially inner crown blocks 23A defined by the crown main groove 11, the crown narrow grooves 16 and the axially inner crown lateral grooves 13A, and axially outer crown blocks 23B define by the crown narrow grooves 16, the shoulder main grooves 12 and the axially outer crown lateral grooves 13B.

Figure 4:
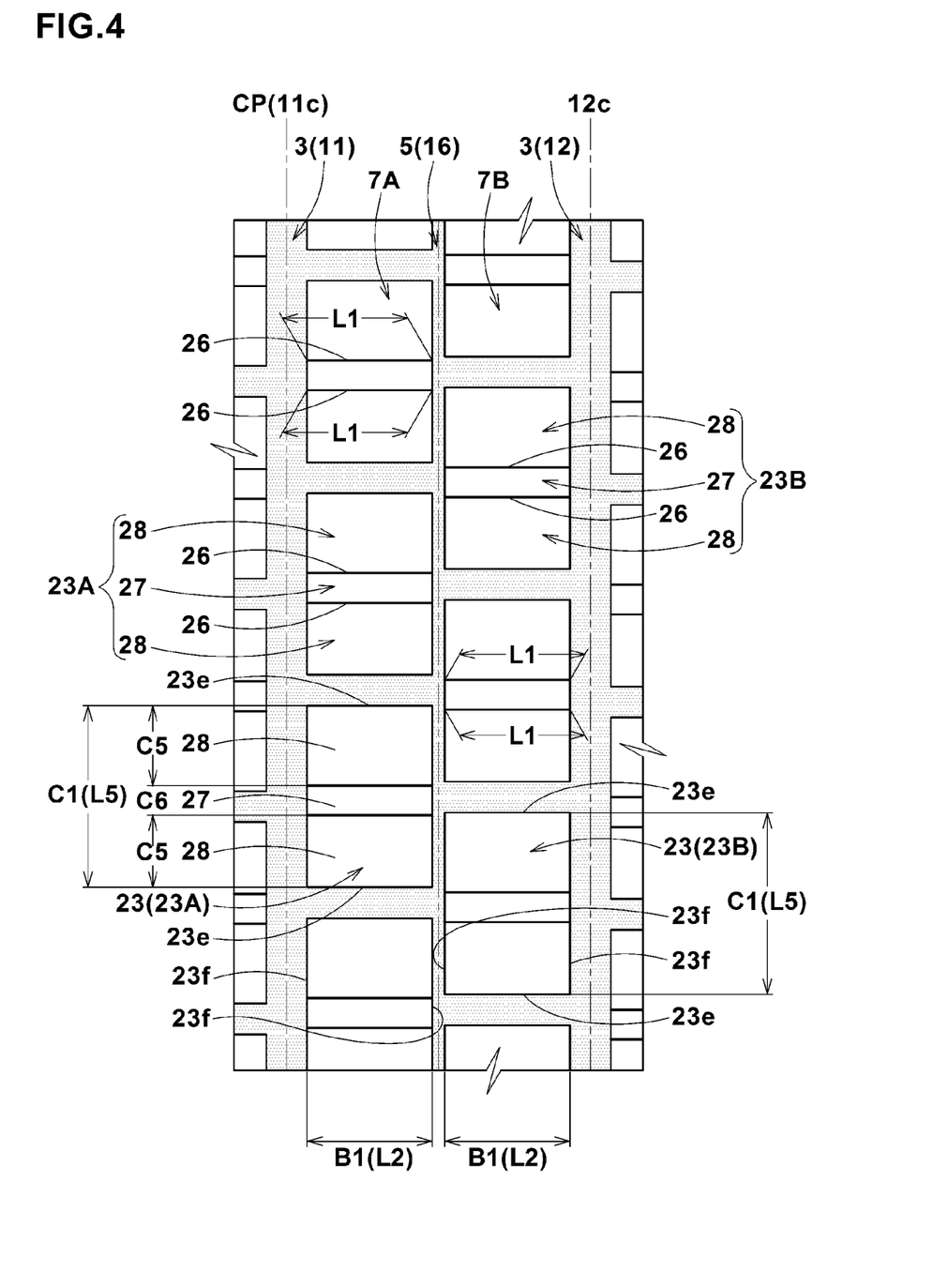
FIG. 4 is an enlarged development view of a part of the crown region in FIG. 3.

In order to improve the traction performance and uneven wear resistance by increasing the circumferential rigidity, the axially inner and outer crown blocks 23A and 23B are each formed to have a ground contacting face 2t having a circumferentially long rectangular shape in which the circumferential length C1 thereof is longer than the axial width B1 thereof. It is preferable that the width B1 is about 15 to 25% of the tread half width 0.5 TW, and the circumferential length C1 is about 138 to 148% of the width B1.

Each of the ground contacting faces 2t of the inner and outer crown blocks 23A and 23B is provided with at least one sipe 26 (in this embodiment two sipes) extending in the tire axial direction. Therefore, the inner and outer crown blocks 23A and 23B are each subdivided into an inner block piece 27 between the sipes 26 and a pair of end block pieces 28 located on both outer sides of the inner block piece 27 in the tire circumferential direction.

As shown in FIG. 3, the shoulder blocks 24 include: inner shoulder blocks 24A divided by the shoulder main grooves 12, the axially inner shoulder narrow grooves 18 and the inner shoulder lateral grooves 14A; intermediate shoulder blocks 24B divided by the axially inner shoulder narrow grooves 18, the axially outer shoulder narrow grooves 19 and the intermediate shoulder lateral grooves 14B; and outer shoulder blocks 24C divided by the axially outer shoulder narrow grooves 19, the tread edges 2e and the outer shoulder lateral grooves 14C.

Figure 5:
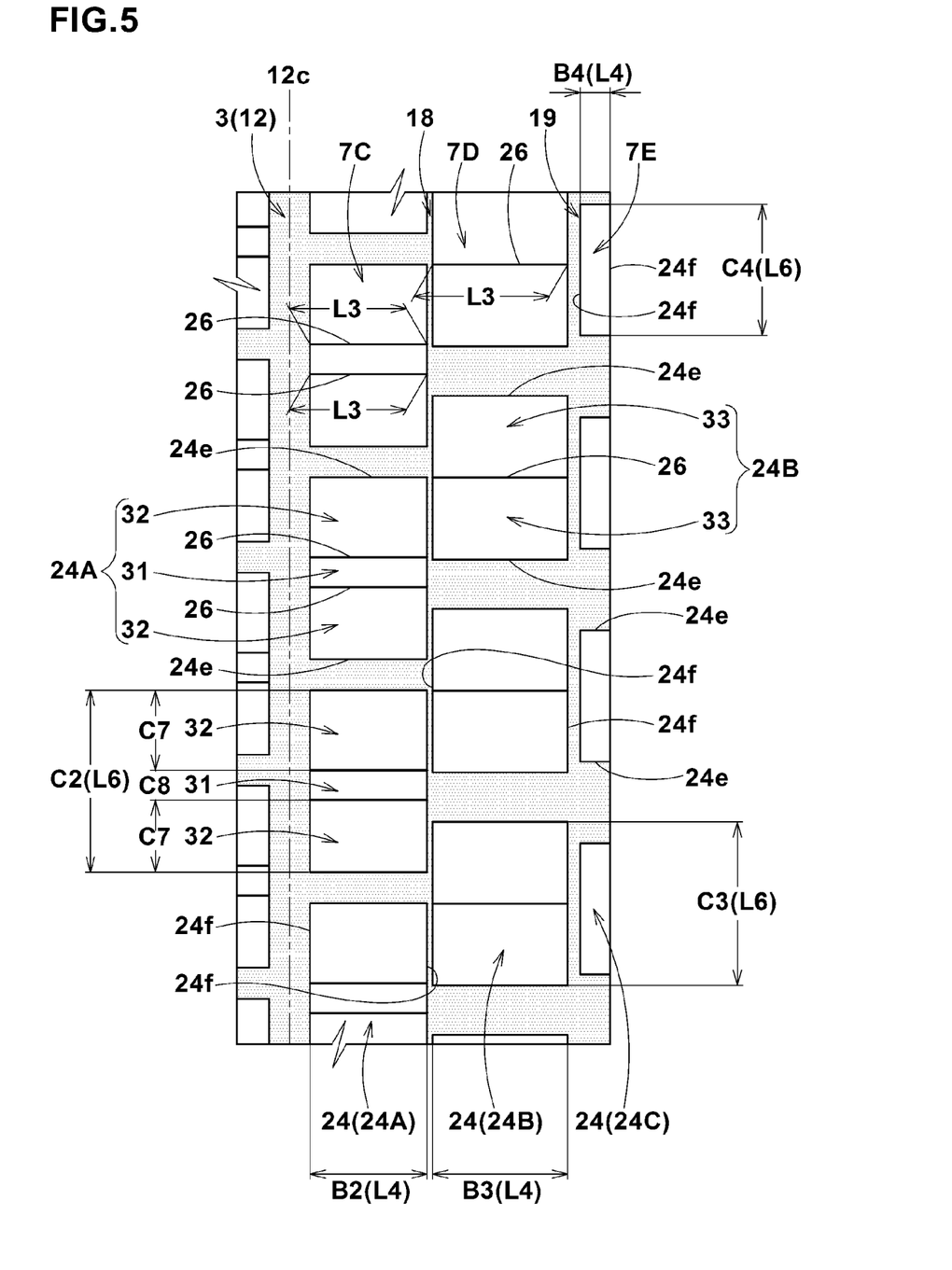
FIG. 5 is an enlarged development view of a part of the shoulder region in FIG. 3.

As shown in FIG. 5, in order to improve the traction performance and uneven wear resistance by increasing the circumferential rigidity, the inner shoulder blocks 24A are each formed to have a ground contacting face 2t having a circumferential length C2 thereof is larger than the axial width B2 thereof. It is preferable that the axial width B2 is about 13 to 23% of the tread half width 0.5 TW, and the circumferential length C2 is about 115 to 125% of the axial width B2.

Each of the ground contacting faces 2t of the inner shoulder blocks 24A is provided with at least one sipe 26 (in this embodiment, two sipes) extending in the tire axial direction. Therefore, the inner shoulder blocks 24A are each subdivided into an inner block piece 31 between the sipes 26 and a pair of end block pieces 32 located on both outer sides of the inner block piece 31 in the tire circumferential direction like the inner and outer crown blocks 23A and 23B.

The intermediate shoulder blocks 24B are each formed to have a ground contacting face 2t having a circumferentially long rectangular shape in which the axial width B3 thereof is larger than the axial width B2 of the inner shoulder block 24A. Such intermediate shoulder blocks 24B are of help to improve the rigidity in the tire axial direction and the steering stability. It is preferable that the axial width B3 is about 17 to 27% of the tread half width 0.5 TW and the circumferential length C3 thereof is about 110 to 120% of the axial width B3.

At least one (in this embodiment only one) sipe 26 extending in the tire axial direction is provided in the ground contacting face 2t of each of the intermediate shoulder blocks 24B at an intermediate position of the circumferential length of the block. Therefore, the intermediate shoulder block 24B is circumferentially subdivided into a pair of end block pieces 33.

The outer shoulder blocks 24C are each formed to have a ground contacting face 2t having a circumferentially long rectangular shape in which a axial width B4 thereof is smaller than the axial width of the inner shoulder blocks 24A. Such outer shoulder block 24C can increase the circumferential edge component, and is of help to enhance the uneven wear resistance. It is preferable that the axial width B4 is about 3 to 7% of the tread half width 0.5 TW, and the circumferential length C4 thereof is about 290 to 310% of the axial width B4. In this embodiment, the ground contacting faces 2t of the outer shoulder blocks 24C are provided with no sipe.

As shown in FIG. 3, the block rows 7 on each side of the tire equator C include: a row 7A of the inner crown blocks 23A, a row 7B of the outer crown blocks 23B, a row 7C of the inner shoulder blocks 24A, a row 7D of the intermediate shoulder blocks 24B, and a row 7E of the outer shoulder blocks 24C. The phase of the inner crown lateral grooves 13A and the phase of the outer crown lateral grooves 13B are shifted from each other about one half pitch. The phase of the inner shoulder lateral grooves 14A and the phase of the intermediate shoulder lateral grooves 14B are shifted from each other about one half pitch. Therefore, the block rows 7A, 7B, 7C and 7D which are adjacent to each other in the tire axial direction are shifted from each other in the tire circumferential direction. However, between the outer shoulder block row 7E and the intermediate shoulder block row 7D, the phases are substantially not shifted in the tire circumferential direction.

The tire 1 having such block rows 7 can exert the edges of the blocks 6 and the sipes 26 in a well balanced manner to increase the frictional force with respect to a frozen road surface and enhance a driving force and a braking force.

As described above, the ground-contact surface 20 of the tread portion 2 becomes small when a tire load is low or a tire pressure is high as shown in FIG. 6(b) as compared with a case where the tire load is high or the tire pressure is low as shown in FIG. 6(a). Therefore, there is a problem that the sipes 26 of the blocks 6 and the block edges in the shoulder regions Sh can not be effectively used, and the on-ice performance is liable to be deteriorated.

Hence, the present inventor focused on the fact that an inner region (tread crown region Cr in this embodiment) of a tire in a tire axial direction located inside of positions away from the tire equatorial plane CP by distances D1 of 0.30 to 0.65 times the tread half width 0.5 TW can stably come into contact with the ground without being influenced by magnitude of a tire load and a tire pressure, and the inventor ascertained that if edges of the blocks 6 and sipes 26 disposed in the inner region were made larger, by a constant range or more, than those in a region (shoulder region Sh in this embodiment) located on an outer side of the inner region, excessive reduction in the edges could be suppressed and on-ice performance could be maintained also when the tire load was low or the tire pressure was high in which case the ground-contact surface 20 of the tread portion 2 became small.

According to the tire 1 of this embodiment, the groove center line 12c of the shoulder main groove 12 is disposed at the distance D1 from the tire equatorial plane CP. Since such a shoulder main groove 12 can stably come into contact with the ground without being influenced by magnitude of a tire load and a tire pressure, it is possible to sufficiently exert the edge and to enhance the on-ice performance. Since the shoulder main groove 12 is disposed at the distance D1 from the tire equatorial plane CP, it is possible to prevent the shoulder region Sh on the outer side in the tire axial direction from being excessively reduced, it is possible to secure the rigidity of the shoulder block 24 and to suppress the uneven wear such as shoulder wear.

For the tire 1, it is important that the following equation (1) is satisfied:

$$(SScr+SBcr)/(SSsh+SBsh) \geq 1.05 \quad (1)$$

wherein,

SScr: a total sum of axial lengths L1 of the sipes 26 of all of the crown blocks 23, SBcr: a total sum of axial lengths L2 of lateral edges 23e of the ground contacting faces 2t of all of the crown blocks 23, wherein each of the lateral edges 23e is one of two circumferentially-opposite lateral edges 23e of the ground contacting face 2t of one of the crown blocks 23, SSsh: a total sum of axial lengths L3 of the sipes 26 of all of the shoulder blocks 24, and SBsh: a total sum of axial lengths L4 of lateral edges 24e of the ground contacting faces 2t of all of the shoulder blocks 24, wherein each of the lateral edges 24e is one of two circumferentially-opposite lateral edges 24 of the ground contacting face 2t of one of the shoulder blocks 24.

The reason why the total sum SBcr is limited to one of two lateral edges 23e is that when the vehicle runs straightly, one of the two lateral edges 23e exerts an edge effect in substance. When the lengths L2 of the two lateral edges 23e are different from each other, the calculation is carried out using larger one of the lengths.

The total sum SBsh is also limited to one of two lateral edges 24e due to the same reason as that of the total sum SBcr, and if the lengths L4 of the lateral edges 24e are different from each other, the calculation is carried out using larger one of the lengths.

In the above equation (1), an edge in the tire axial direction in each of the crown blocks 23 and the shoulder blocks 24 is defined. According to the tire 1 which satisfies the equation (1), the edge of the crown block 23 can be made larger than that of the shoulder block 24, and it is possible to suppress the excessive reduction in the edge even when a tire load is low or a tire pressure is high in which case the ground-contact surface 20 of the tread portion 2 is reduced. Therefore, it is possible for the tire 1 of the invention to maintain the on-ice performance without being influenced by magnitude of the tire load and the tire pressure.

If the distance D1 of the shoulder main groove 12 is less than 0.30 times the tread half width 0.5 TW, the shoulder main groove 12 is disposed on an excessively inner side in the tire axial direction, the rigidity of the tread crown region Cr becomes small, and there is a possibility that the uneven wear resistance is deteriorated, for example, the center wear is liable to be generated. If the distance D1 exceeds 0.65 times the tread half width 0.5 TW on the contrary, the shoulder main groove 12 does not come into contact when the tire load is low or the tire pressure is high, and the above effect can not be expected. From the viewpoint of this, the distance D1 is preferably 0.35 times or more of the tread half width 0.5 TW, more preferably 0.4 times or more, and preferably 0.6 times or less, and more preferably 0.55 times or less.

If the ratio ((SScr+SBcr)/(SSsh+SBsh)) is less than 1.05, the edge is reduced when the tire load is low or the tire pressure is high, and the effect can not be expected. If the ratio ((SScr+SBcr)/(SSsh+SBsh)) is excessively large on the contrary, the sipe 26 is excessively increased, the rigidity of the tread crown region Cr becomes small, and there is a possibility that the uneven wear resistance is deteriorated, for example, the center wear is liable to be generated. From the viewpoint of this, the ratio (SScr+SBcr)/(SSsh+SBsh) is preferably 1.10 or more, more preferably 1.15 or more, and preferably 2.00 or less, and more preferably 1.50 or less.

The total sum SScr is preferably 1.05 times or more of the total sum SSsh, and more preferably 1.10 times or more of the total sum SSsh.

If the total sum SScr becomes excessively small, the number of the sipes 26 of the crown block 23 having a high contribution ratio of the on-ice performance is excessively reduced, and there is a possibility that even if the above equation (1) is satisfied, the on-ice performance can not be sufficiently enhanced. If the total sum SScr becomes excessively large on the contrary, the number of the sipes 26 of the crown block 23 is excessively increased and there is a possibility that the rigidity of the tread portion 2 is lowered and the on-ice performance and the uneven wear resistance are deteriorated. From the viewpoint of this, the total sum SSsr is preferably 2.00 times or less of the total sum SSsh, and more preferably 1.50 times or less of the total sum SSsh.

It is also preferable that the following equation (2) is satisfied.

$$(SLcr+SScr+SBcr)/(SLsh+SSsh+SBsh) \geq 1.05 \quad (2)$$

wherein,

SLcr: a total sum of circumferential lengths L5 of longitudinal edges 23f of all of the crown blocks 23, wherein each of the longitudinal edges 23f is one of two axially-opposite longitudinal edges 23f of one of the crown blocks 23, and SLsh: a total sum of circumferential lengths L6 of longitudinal edges 24f of all of the shoulder blocks 24, wherein each of the longitudinal edges 24f is one of two axially-opposite longitudinal edges 24f of one of the shoulder blocks 24.

The reason why the total sum SLcr is limited to one of the two axially-opposite longitudinal edges 23f is that, during cornering, one of the two axially-opposite longitudinal edges 23f exerts an edge effect in substance. If the lengths L5 of the longitudinal edges 23f are different from each other, the calculation is carried out using larger one of the lengths.

The total sum SLsh is also limited to one of the two axially-opposite longitudinal edges 24f due to the same reason as that of the total sum SLcr, and if the lengths L6 of the longitudinal edges 24f are different from each other, the calculation is carried out using larger one of the lengths.

In the above equation (2), an edge in the tire circumferential direction is defined in addition to the edge in the tire axial direction of the equation (1). A tire 1 which satisfies the equation (2) can effectively obtain excellent grip on ice both when the vehicle runs straightly and when the vehicle corners.

If the ratio ((SLcr+SScr+SBcr)/(SLsh+SSsh+SBsh)) is less than 1.05, the above effect can not be expected. If the ratio ((SLcr+SScr+SBcr)/(SLsh+SSsh+SBsh)) is excessively large on the contrary, there is a possibility that the rigidity of the tread portion 2 is deteriorated. From the viewpoint of this, the ratio ((SLcr+SScr+SBcr)/(SLsh+SSsh+SBsh)) is preferably 1.10 or more, more preferably 1.15 or more, and preferably 2.00 or less, and more preferably 1.50 or less.

The total sum SLcr is preferably 1.05 times or more of the total sum SLsh, and more preferably 1.10 times or more of the total sum SLsh. If the total sum SLcr becomes excessively small, the longitudinal edge of the crown block 23 becomes excessively small and there is a possibility that cornering grip is deteriorated. If the total sum SLcr becomes excessively large on the contrary, the block rigidity of the crown block 23 is decreased, and there is a possibility that the on-ice performance and the uneven wear resistance are deteriorated. From the viewpoint of this, the total sum SLcr is preferably 2.00 times or less of the total sum SLsh, and more preferably 1.50 times or less of the total sum SLsh.

As shown in FIG. 2, it is preferable that the groove depth G3 of the narrow groove 5 is smaller than the groove depth G1 of the main groove 3. Therefore, the narrow groove 5 can exert the effect of the longitudinal edge while suppressing the deterioration of the block rigidity.

To effectively exert such an effect, the groove depth G3 of the narrow groove 5 is preferably 0.55 times or more of the groove depth G1 of the main groove 3, and more preferably 0.60 times or more of the groove depth G1 of the main groove 3. If the groove depth G3 of the narrow groove 5 is excessively small, there is a possibility that the longitudinal edge of each block 6 can not sufficiently be exerted. If the groove depth G3 of the narrow groove 5 is excessively large on the contrary, there is a possibility that the block rigidity is lowered and the uneven wear resistance is lowered. From the viewpoint of this, the groove depth G3 of the narrow groove is preferably 0.85 times or less of the groove depth G1 of the main groove 3, and more preferably 0.80 times or less of the groove depth G1 of the main groove 3.

The groove depth G3b of the axially inner shoulder narrow groove 18 is preferably 55% or more, more preferably 60% or more of the groove depth G3c of the axially outer shoulder narrow groove 19. If the groove depth G3b becomes excessively small, there is a possibility that the edge can not sufficiently be enhanced. If the groove depth G3b becomes excessively large on the contrary, the rigidity of the ground contacting face 2t near the axially inner shoulder narrow groove 18 where the ground-contact surface 20 is liable to be changed due to magnitude of a tire load and a tire pressure is lowered, and there is a possibility that uneven wear is generated. From the viewpoint of this, the groove depth G3b is preferably 85% or less, more preferably 80% or less of the groove depth G3c.

From the same viewpoint, the groove width W4 of the axially inner shoulder narrow groove 18 is preferably 15% or more, more preferably 20% or more, and preferably 50% or less, and more preferably 45% or less of the groove width W5 of the axially outer shoulder narrow groove 19 as shown in FIG. 3.

It is preferable that the number of sipes 26 is gradually reduced from the inner shoulder blocks 24A toward the outer shoulder blocks 24C. Therefore, the block rigidities of the inner, intermediate and outer shoulder blocks 24A, 24B and 24C are increased toward the outer side in the tire axial direction where the ground-contact pressure is increased at the time of cornering, and the on-ice performance can be enhanced.

As shown in FIG. 4, it is preferable that circumferential lengths C5 of the end block pieces 28 of the inner and outer crown blocks 23A and 23B are larger than a circumferential length C6 of the inner block piece 27. Therefore, it is possible to enhance the block rigidities of both ends of the inner and outer crown blocks 23A and 23B in the tire circumferential direction, and the uneven wear resistance is improved.

To effectively exert such effect, the circumferential lengths C5 of the end block pieces 28 of the inner and outer crown blocks 23A and 23B are preferably 110% or more, and more preferably 120% or more of the circumferential length C6 of the inner block piece 27.

If the circumferential length C5 becomes excessively small, the block rigidities of both ends of the inner and outer crown blocks 23A and 23B in the tire circumferential direction become small, and there is a possibility that the uneven wear resistance is lowered. If the circumferential length C5 becomes excessively large on the contrary, the sipes 26 are disposed on the inner side of the ground contacting faces 2t of the inner and outer crown blocks 23A and 23B in the tire circumferential direction, and there is a possibility that the on-ice performance is lowered. From the viewpoint of this, the circumferential length C5 is preferably 200% or less, and more preferably 150% or less of the circumferential length C6.

From the same viewpoint, as shown in FIG. 5, circumferential lengths C7 of the end block pieces 32 of the inner shoulder block 24A are preferably 110% or more, more preferably 120% or more, and preferably 200% or less, and more preferably 150% or less of the circumferential length C8 of the inner block piece 31.

It is preferable that the inner and outer crown blocks 23A and 23B are shifted from each other in phase so that the end block pieces 28 are superposed on each other in the tire axial direction. Therefore, the end block pieces 28 having relatively high rigidities are arranged in the tire axial direction, the block rigidities of the inner and outer crown blocks 23A and 23B can be enhanced and the on-ice performance can be enhanced.

Although the embodiment of the invention has been described in detail, the invention is not limited to the embodiment and the invention can variously be modified and carried out.

EXAMPLE

Tires having the basic structure shown in FIG. 1, and having the blocks and sipes shown in Table 1 were produced, and performance of the tires were evaluated. Common specifications are as follows:
  tire size: 11R22.5 14PR
  rim size: 22.5×7.50
  a half tread width 0.5 TW: 120 mm
  crown main groove, shoulder main grooves:
  groove width W1: 5 mm
  groove depth G1: 20 mm ratio (W1/0.5 TW): 4.17%
ratio (G1/0.5 Tw): 16.7%
crown lateral groove, shoulder lateral groove:
groove width W2a: 6 mm
groove width W2b: 10 mm
groove width W2c: 15 mm
groove depth G2: 20 mm
ratio (W2a/0.5 TW): 5.0%
ratio (W2b/0.5 TW): 8.3%
ratio (W2c/0.5 TW): 12.5%
ratio (G2/0.5 TW): 16.7%
crown narrow groove:
distance D2: 30 mm
groove width W3: 2 mm
ratio (D2/0.5 TW): 0.25
ratio (W3/0.5 TW): 1.67%
inner shoulder narrow groove:
distance D3: 90 mm
ratio (D3/0.5 TW): 0.75
outer shoulder narrow groove:
distance D4: 115 mm
ratio (D4/0.5 TW): 0.96
inner crown block, outer crown block:
circumferential length C1: 32 mm
width B1: 25 mm
ratio (B1/0.5 TW): 20.8%
ratio (C1/B1): 128%
inner shoulder block:
width B2: 25 mm
circumferential length C2: 32 mm
ratio (B2/0.5 TW): 20.8%
ratio (C2/B2): 128%
intermediate shoulder block:
width B3: 27 mm
circumferential length C3: 28 mm
ratio (B3/0.5 TW): 22.5%
ratio (C3/B3): 104%
outer shoulder block:
width B4: 5 mm
circumferential length C4: 23 mm
ratio (B4/0.5 TW): 4.2%
ratio (C4/B4): 460%

A test method is as follows:

<On-Ice Performance>

The test tire was mounted on a rim, and inflated to 800 kPa, and the tires was installed on all of the wheels of a 2-D vehicle with a carrying capacity of 8.5 tons, feeling when the vehicle was made to start and accelerate from a stopped state on a test course of a frozen road (road surface temperature was −2 to 0 degree) under a half of the carrying capacity (load on front wheel: 26.72 kN, load on rear wheel: 11.38 kN) was evaluated by a professional test driver's sensory evaluation. Results are shown with points in which an embodiment 1 is evaluated as 100. The greater the numeric value is, the more excellent the result is.

<Uneven Wear Resistance>

The test tire was mounted on a rim and installed on all of the wheels of the vehicle under the above condition, the vehicle was made to run 300 km on a dry asphalt and thereafter, a difference between a worn amount of blocks near the shoulder main groove and a worn amount of other blocks at three locations on the tire circumference was measured. Results are shown with indices in such a manner that an average value of the worn amounts of the embodiment 1 is evaluated as 100. The smaller the numeric value is, the more excellent the result is. The results of the test are shown in Table 1.

As the results of the tests, it could be confirmed that each of tires of the embodiments of the present invention could maintain the on-ice performance without being influenced by magnitude of a tire load and a tire pressure.

TABLE 1

|  | Comparative example 1 | Comparative example 2 | Comparative example 3 | Comparative example 4 | Example 1 | Example 2 | Example 3 | Example 4 | Example 5 |
| --- | --- | --- | --- | --- | --- | --- | --- | --- | --- |
| Distance D1 of shoulder main groove (mm) | 30 | 84 | 50 | 56 | 60 | 60 | 72 | 60 | 60 |
| Ratio (D1/0.5 TW) | 0.25 | 0.70 | 0.42 | 0.47 | 0.50 | 0.50 | 0.60 | 0.50 | 0.50 |
| Total sum SScr (mm) | 9600 | 23680 | 12800 | 14720 | 16000 | 17280 | 20160 | 17280 | 17280 |
| Total sum SBcr (mm) | 4800 | 11840 | 6400 | 7360 | 8000 | 8640 | 10080 | 8640 | 8640 |
| Total sum SLcr (mm) | 10240 | 10240 | 10240 | 10240 | 10240 | 10240 | 10240 | 10560 | 10240 |
| Total sum SSsh (mm) | 19520 | 6560 | 14720 | 13280 | 12320 | 12320 | 10080 | 12320 | 8640 |
| Total sum SBsh (mm) | 13120 | 4480 | 9920 | 8960 | 8320 | 8320 | 6720 | 8320 | 4320 |
| Total sum SLsh (mm) | 9600 | 9600 | 9600 | 9600 | 9600 | 9600 | 9600 | 9600 | 9600 |
| Ratio ((SScr + SBcr)/(SSsh + SBsh)) | 0.44 | 3.22 | 0.78 | 0.99 | 1.16 | 1.26 | 1.80 | 1.26 | 2.00 |
| Ratio (SScr/SSsh) | 0.49 | 3.61 | 0.87 | 1.11 | 1.30 | 1.40 | 2.00 | 1.40 | 2.00 |
| Ratio ((SLcr + SScr + SBcr)/(SLsh + SSsh + SBsh)) | 0.58 | 2.22 | 0.86 | 1.02 | 1.13 | 1.20 | 1.53 | 1.21 | 1.60 |
| Ratio (SLcr/SLsh) | 1.07 | 1.07 | 1.07 | 1.07 | 1.07 | 1.07 | 1.07 | 1.10 | 1.07 |
| Groove depth G3 of narrow groove (mm) | 12 | 12 | 12 | 12 | 12 | 12 | 12 | 12 | 12 |
| Ratio (G3/G1) | 0.6 | 0.6 | 0.6 | 0.6 | 0.6 | 0.6 | 0.6 | 0.6 | 0.6 |
| Width B1 (mm) | 25 | 25 | 25 | 25 | 25 | 27 | 21 | 25 | 27 |
| Ratio (B1/0.5 W) (%) | 20.8 | 20.8 | 20.8 | 20.8 | 20.8 | 22.5 | 17.5 | 20.8 | 22.5 |
| Ratio (C1/B1) (%) | 128 | 128 | 128 | 128 | 128 | 119 | 152 | 128 | 119 |
| Length C5 of end block piece (mm) | 13 | 13 | 13 | 13 | 13 | 13 | 13 | 13 | 13 |
| Length C6 of inner block piece (mm) | 6 | 6 | 6 | 6 | 6 | 6 | 6 | 6 | 6 |
| Ratio (C5/C6) (%) | 217 | 217 | 217 | 217 | 217 | 217 | 217 | 217 | 217 |
| Groove depth G3b of inner shoulder narrow groove (mm) | 12 | 12 | 12 | 12 | 12 | 12 | 12 | 12 | 12 |
| Groove depth G3c of outer shoulder narrow groove (mm) | 12 | 12 | 12 | 12 | 12 | 12 | 12 | 12 | 12 |
| Ratio (G3b/G3c) (%) | 100 | 100 | 100 | 100 | 100 | 100 | 100 | 100 | 100 |
| Groove width W4 of inner shoulder narrow groove (mm) | 1 | 1 | 1 | 1 | 1 | 1 | 1 | 1 | 1 |
| Groove width W5 of outer shoulder narrow groove (mm) | 2 | 2 | 2 | 2 | 2 | 2 | 2 | 2 | 2 |

TABLE 1-continued

|  | | | | | | | | | |
|---|---|---|---|---|---|---|---|---|---|
| Ratio (W4/W5) (%) | 50 | 50 | 50 | 50 | 50 | 50 | 50 | 50 | 50 |
| On-ice performance (index) [the greater the numeric value is, the more excellent the result is] | 90 | 98 | 90 | 92 | 100 | 110 | 105 | 112 | 110 |
| Uneven wear resistance (index) [the greater the numeric value is, the more excellent the result is] | 85 | 85 | 100 | 100 | 100 | 100 | 100 | 100 | 95 |

|  | Example 6 | Example 7 | Example 8 | Example 9 | Example 10 | Example 11 | Example 12 | Example 13 |
|---|---|---|---|---|---|---|---|---|
| Distance D1 of shoulder main groove (mm) | 60 | 60 | 60 | 60 | 60 | 60 | 60 | 60 |
| Ratio (D1/0.5 TW) | 0.50 | 0.50 | 0.50 | 0.50 | 0.50 | 0.50 | 0.50 | 0.50 |
| Total sum SScr (mm) | 12940 | 16000 | 16000 | 16000 | 16000 | 16000 | 16000 | 16000 |
| Total sum SBcr (mm) | 8640 | 8000 | 8000 | 8000 | 8000 | 8000 | 8000 | 8000 |
| Total sum SLcr (mm) | 10240 | 10240 | 10240 | 9600 | 10080 | 10240 | 10240 | 10240 |
| Total sum SSsh (mm) | 12320 | 8000 | 13690 | 8000 | 12320 | 12320 | 12320 | 12320 |
| Total sum SBsh (mm) | 8320 | 4000 | 9240 | 4000 | 8320 | 8320 | 8320 | 8320 |
| Total sum SLsh (mm) | 9600 | 9600 | 9600 | 4800 | 9600 | 5120 | 9600 | 9600 |
| Ratio ((SScr + SBcr)/(SSsh + SBsh)) | 1.05 | 2.00 | 1.05 | 2.00 | 1.16 | 1.16 | 1.16 | 1.16 |
| Ratio (SScr/SSsh) | 1.05 | 2.00 | 1.17 | 2.00 | 1.30 | 1.30 | 1.30 | 1.30 |
| Ratio ((SLcr + SScr + SBcr)/(SLsh + SSsh + SBsh)) | 1.05 | 1.59 | 1.05 | 2.00 | 1.13 | 1.33 | 1.13 | 1.13 |
| Ratio (SLcr/SLsh) | 1.07 | 1.07 | 1.07 | 2.00 | 1.05 | 2.00 | 1.07 | 1.07 |
| Groove depth G3 of narrow groove (mm) | 12 | 12 | 12 | 12 | 12 | 12 | 11 | 17 |
| Ratio (G3/G1) | 0.6 | 0.6 | 0.6 | 0.6 | 0.6 | 0.6 | 0.55 | 0.85 |
| Width B1 (mm) | 25 | 25 | 25 | 25 | 25 | 25 | 25 | 25 |
| Ratio (B1/0.5 W) (%) | 20.8 | 20.8 | 20.8 | 20.8 | 20.8 | 20.8 | 20.8 | 20.8 |
| Ratio (C1/B1) (%) | 128 | 128 | 128 | 128 | 128 | 128 | 128 | 128 |
| Length C5 of end block piece (mm) | 13 | 13 | 13 | 13 | 13 | 13 | 13 | 13 |
| Length C6 of inner block piece (mm) | 6 | 6 | 6 | 6 | 6 | 6 | 6 | 6 |
| Ratio (C5/C6) (%) | 217 | 217 | 217 | 217 | 217 | 217 | 217 | 217 |
| Groove depth G3b of inner shoulder narrow groove (mm) | 12 | 12 | 12 | 12 | 12 | 12 | 12 | 12 |
| Groove depth G3c of outer shoulder narrow groove (mm) | 12 | 12 | 12 | 12 | 12 | 12 | 12 | 12 |
| Ratio (G3b/G3c) (%) | 100 | 100 | 100 | 100 | 100 | 100 | 100 | 100 |
| Groove width W4 of inner shoulder narrow groove (mm) | 1 | 1 | 1 | 1 | 1 | 1 | 1 | 1 |
| Groove width W5 of outer shoulder narrow groove (mm) | 2 | 2 | 2 | 2 | 2 | 2 | 2 | 2 |
| Ratio (W4/W5) (%) | 50 | 50 | 50 | 50 | 50 | 50 | 50 | 50 |
| On-ice performance (index) [the greater the numeric value is, the more excellent the result is] | 95 | 98 | 98 | 95 | 100 | 100 | 98 | 100 |
| Uneven wear resistance (index) [the greater the numeric value is, the more excellent the result is] | 100 | 95 | 98 | 100 | 98 | 90 | 100 | 98 |

What is claimed is:

1. A heavy duty pneumatic tire comprising
a tread portion having a tread width and provided with circumferentially continuously extending main grooves defined as having a width of 4% to 8% of one half of the tread width, circumferentially continuously extending narrow grooves defined as having a width of not less than 1% of one half of the tread width and less than the width of the main grooves, and lateral grooves defined as having a width of 3% to 7% of one half of the tread width,
the tread portion being provided with blocks defined and divided by the main grooves, the narrow grooves, and the lateral grooves,
wherein
a pair of shoulder main grooves which are the axially outermost main grooves, are disposed one on each side of the tire equator so that the center line of the groove is at a distance of 0.30 to 0.65 times one half of the tread width from the tire equator,
the narrow grooves are an axially inner shoulder narrow groove and an axially outer shoulder narrow groove which are disposed between each of the shoulder main grooves and the adjacent tread edge, and the width of the inner shoulder narrow groove is smaller than the width of the outer shoulder narrow groove,
the blocks are
crown blocks disposed between the shoulder main grooves, and
shoulder blocks axially outside the shoulder main grooves, the shoulder blocks are
axially inner shoulder blocks between the shoulder main grooves and the inner shoulder narrow grooves,
intermediate shoulder blocks between the inner shoulder narrow grooves and the outer shoulder narrow grooves, and
axially outer shoulder blocks between the outer shoulder narrow grooves and the tread edges,
the crown blocks are each provided with only two sipes extending across the entire axial width of the block,
the axially inner shoulder blocks are each provided with only two sipes extending across the entire axial width of the block,
the intermediate shoulder blocks are each provided with only one sipe extending across the entire axial width of the block, and the axially outer shoulder blocks are provided with no sipe,
wherein
the following equation (1) is satisfied, $$(SScr+SBcr)/(SSsh+SBsh) \geq 1.05 \quad (1)$$

wherein
SScr: a total sum of axial lengths of the sipes of all of the crown blocks,
SBcr: a total sum of axial lengths of lateral edges of the ground contacting faces of all of the crown blocks, wherein each of the lateral edges is one of two circumferentially-opposite lateral edges of the ground contacting face of one of the crown blocks,
SSsh: a total sum of axial lengths of the sipes of all of the shoulder blocks, and
SBsh: a total sum of axial lengths of lateral edges of the ground contacting faces of all of the shoulder blocks, wherein each of the lateral edges is one of two circumferentially-opposite lateral edges of the ground contacting face of one of the shoulder blocks, and
the following equation (2) is satisfied:

$$(SLcr+SScr+SBcr)/(SLsh+SSsh+SBsh) \geq 1.05 \quad (2)$$

wherein
SLcr: a total sum of circumferential lengths of longitudinal edges of all of the crown blocks, wherein each of the longitudinal edges is one of two axially-opposite longitudinal edges of one of the crown blocks, and
SLsh: a total sum of circumferential lengths of longitudinal edges of all of the shoulder blocks, wherein each of the longitudinal edges is one of two axially-opposite longitudinal edges of one of the shoulder blocks, and
wherein
the total sum SLcr is at least 1.05 times the total sum SLsh.

2. The heavy duty pneumatic tire according to claim 1, wherein the depth of the narrow grooves is 0.55 to 0.85 times the depth of the main grooves.

3. The heavy duty pneumatic tire according to claim 1, wherein the crown blocks are arranged in plural circumferential rows, and the rows which are adjacent to each other in the tire axial direction are circumferentially shifted from each other in phase.

4. The heavy duty pneumatic tire according to claim 3, wherein the axially inner shoulder blocks on each side of the tire equator are circumferentially arranged in a row, and the row is circumferentially shifted from the adjacent row of the crown blocks.

5. The heavy duty pneumatic tire according to claim 4, wherein the intermediate shoulder blocks on each side of the tire equator are circumferentially arranged in a row, and the row is circumferentially shifted from the adjacent row of the axially inner shoulder blocks.

6. The heavy duty pneumatic tire according to claim 5, wherein the axially outer shoulder blocks on each side of the tire equator are circumferentially arranged in a row, and the row is not circumferentially shifted from the adjacent row of the intermediate shoulder blocks.

7. The heavy duty pneumatic tire according to claim 1, wherein the total sum SScr is at least 1.05 times the total sum SSsh.

\* \* \* \* \*